US010730442B2

United States Patent
Kim et al.

(10) Patent No.: US 10,730,442 B2
(45) Date of Patent: Aug. 4, 2020

(54) COVER FOR CUP HOLDER DEVICE FOR VEHICLE

(71) Applicant: SEOYON E-HWA CO., LTD., Seoul (KR)

(72) Inventors: Jae Min Kim, Anyang-si (KR); Bong Ju Choi, Anyang-si (KR)

(73) Assignee: SEOYON E-HWA CO., LTD., Seoul (KR)

( * ) Notice: Subject to any disclaimer, the term of this patent is extended or adjusted under 35 U.S.C. 154(b) by 32 days.

(21) Appl. No.: 16/180,975

(22) Filed: Nov. 5, 2018

(65) Prior Publication Data

US 2019/0135153 A1  May 9, 2019

(30) Foreign Application Priority Data

Nov. 9, 2017  (KR) .................. 10-2017-0148903

(51) Int. Cl.
*B60N 3/10* (2006.01)
*B60R 7/04* (2006.01)

(52) U.S. Cl.
CPC ............... *B60R 7/04* (2013.01); *B60N 3/102* (2013.01)

(58) Field of Classification Search
CPC ................................ B60N 3/102; B60R 7/04
USPC ...................................................... 296/24.34
See application file for complete search history.

(56) References Cited

U.S. PATENT DOCUMENTS

| 7,540,391 | B2* | 6/2009 | Kato ........................ B60R 7/04 220/252 |
| 2004/0130174 | A1* | 7/2004 | Laskey .................. B60N 3/102 296/37.1 |
| 2012/0024857 | A1* | 2/2012 | Kodama ................ A45C 13/16 220/350 |
| 2015/0184445 | A1* | 7/2015 | Lin .......................... E06B 3/46 220/200 |
| 2015/0258939 | A1* | 9/2015 | Hipshier ................... B60R 7/04 160/229.1 |
| 2019/0136611 | A1* | 5/2019 | Hipshier ................... B60R 5/00 |

FOREIGN PATENT DOCUMENTS

| JP | 2006152654 A | 6/2006 |
| KR | 10-2006-0032551 A | 4/2006 |

* cited by examiner

*Primary Examiner* — Jason S Morrow
(74) *Attorney, Agent, or Firm* — Novick, Kim & Lee, PLLC; Jae Youn Kim

(57) ABSTRACT

A cover for a cup holder device for a vehicle includes a cover unit including a body, and a side surface protrusion group formed to be protruded on both side surfaces of the body and provided in plural along the longitudinal direction of the body; and a support unit installed at the bottom surface side of the cover unit to support the load of the cover unit, and having a structure in which a plurality of support members formed in the shape of a slice, respectively, are installed to be spaced apart from each other in the longitudinal direction of the cover unit.

8 Claims, 8 Drawing Sheets

COVER FOR CUP HOLDER DEVICE FOR VEHICLE

CROSS-REFERENCE TO RELATED APPLICATIONS

The instant application claims priority to Korean patent application No. 10-2017-0148903 filed on Nov. 9, 2017, the entire content of which is hereby incorporated by reference.

BACKGROUND OF THE DISCLOSURE

Field of the Disclosure

The present disclosure relates to a cover for a cup holder device for a vehicle, and more particularly, to a cover for a cup holder device for a vehicle, which opens and closes a receiving space of a cup holder device provided inside a vehicle, and has both side portions fitted into a pair of guide grooves, which have the bent portions at both sides of the upper portion of the receiving space and are provided to face each other, to be slidably moved.

Description of the Related Art

There is a trend that a cup holder device for fitting and storing a drink cup, etc. therein for a passenger's convenience is mounted between the driver seat and passenger seat of a vehicle.

Such a cup holder device has a receiving space having the upper portion opened.

In addition, the cup holder device is mounted in a structure that is opened and closed by a cover in order to prevent foreign matter from being flowed into the receiving space. In this case, the cover can be installed in a hinge driving structure, a slide driving structure, etc.

Particularly, the slide driving structure can be implemented by a method that both side portions of the cover are provided at both sides of the upper portion of the receiving space and the portions bent to the outside of the rear of the receiving space are fitted into a pair of guide grooves provided to face each other to be slidably moved.

In this regard, Korean Patent Publication No. 10-2006-0032551 (Patent Document 1) has been disclosed as the related art that relates to the cover for the cup holder device for the vehicle.

The Patent Document 1 relates to a cup holder for a vehicle having a sliding cover and a method for manufacturing the same, and discloses a slide cover composed of a plate made of a flexible material and a frame made of a hard material. In this case, the plate is made of a flexible material to be flexibly bent, and the frame is made of a hard material having higher rigidity than the plate in order to withstand a load due to a driver's pressure, etc.

However, in the Patent Document 1, there is a problem in that a protrusion structure (referred to as 'a first contact surface and a second contact surface') for guiding the slide movement of the cover while contacting the inside surface of the guide groove is formed on a frame made of a hard material, such that it causes frictional noise upon actual operation and reduces the feeling of operation.

In addition, there is a problem in that the technique of the Patent Document 1 does not disclose a structure for guiding the slide movement of the cover with respect to the side surface of the guide groove.

RELATED ART DOCUMENT

Patent Document (Patent Document 1) Korean Patent Publication No. 10-2006-0032551

SUMMARY OF THE DISCLOSURE

The present disclosure is intended to solve the above problems, and an object of the present disclosure is to provide a cover for a cup holder device for a vehicle, which reduces frictional noise and enhances the feeling of operation when both side portions thereof are fitted into a pair of guide grooves provided at both sides of an upper portion of a receiving space to be slidably moved.

In addition, another object of the present disclosure is to provide a cover for a cup holder device for a vehicle, which increases the coupling force between parts thereof, thus enhancing durability.

A cover for a cup holder device for a vehicle in accordance with an embodiment of the present disclosure relates to a cover for a cup holder device for a vehicle, which opens and closes a receiving space of a cup holder device provided inside a vehicle, and has both side portions fitted into a pair of guide grooves, which are provided at both sides of the upper portion of the receiving space, have the portions bent to the outside of the rear of the receiving space, and are provided to face each other, to be slidably moved.

In this case, the cover for the cup holder device for the vehicle in accordance with an embodiment of the present disclosure is configured to include a cover unit including a body, and a side surface protrusion group formed to be protruded on both side surfaces of the body and provided in plural along the longitudinal direction of the body; and a support unit installed on the bottom surface side of the cover unit to support the load of the cover unit, and having a structure in which a plurality of support members formed in the shape of a slice, respectively, are installed to be spaced apart from each other in the longitudinal direction of the cover unit.

In this time, it is preferable that the support member is configured to include the central portion having the attachment surface attached to the bottom surface of the body of the cover unit, respectively, and a pair of coupling protrusions formed to be protruded on both side surfaces of the central portion and coupled to the side surface protrusion group of the cover unit.

In addition, both the cover unit and the support unit are made of a resin material, and the rigidity of the support unit is greater than that of the cover unit.

In this time, the cover unit can be configured to contain a TPE resin, and the support unit can be configured to contain an ABS resin.

Meanwhile, the side surface protrusion group can be configured to include a plurality of first side surface protrusion contacting a ceiling surface and a side surface of the guide groove; and a plurality of second side surface protrusion contacting a bottom surface and the side surface of the guide groove.

In this time, it is preferable that the first side surface protrusion and the second side surface protrusion are alternately located in the longitudinal direction of the body.

In addition, the side surface protrusion group can be located so that the same kind of the first side surface protrusion or the second side surface protrusion is symmetrical to each other in the width direction of the body.

Meanwhile, the first side surface protrusion and the second side surface protrusion can be formed with an installation hole into which the coupling protrusion of the support member is fitted in the width direction of the body, respectively.

In this case, it is preferable that the first side surface protrusion and the second side surface protrusion are formed with a stepped portion on which an end portion of the coupling protrusion hits the inside surface of the installation hole.

As described above, the cover for the cup holder device for the vehicle in accordance with the present disclosure includes the first side surface protrusion and the second side surface protrusion for guiding the slide movement of the cover unit having a weaker rigidity than the support unit, thus reducing frictional noise when the cover is opened and closed and enhancing the feeling of operation.

In addition, it is possible to apply the structure in which the support member included in the support unit is fitted into and coupled to the first side surface protrusion and the second side surface protrusion, thus enhancing durability.

DESCRIPTION OF SPECIFIC EMBODIMENTS

In the present disclosure, illustrations of the accompanying drawings can be exaggerated for differentiation and clarity from the related art, and convenience of understanding a technology. In addition, the terms that will be described later are defined by taking functions of the present disclosure into account, and can be changed according to the intention or custom of a user or an operator, such that definition of the terms should be made according to the technical descriptions throughout the specification. Meanwhile, embodiments of the present disclosure are only examples of components recited in claims of the present disclosure, and do not limit the scope of the present disclosure, and the claims should be construed based on the technical spirit throughout the specification of the present disclosure.

Figure 1:
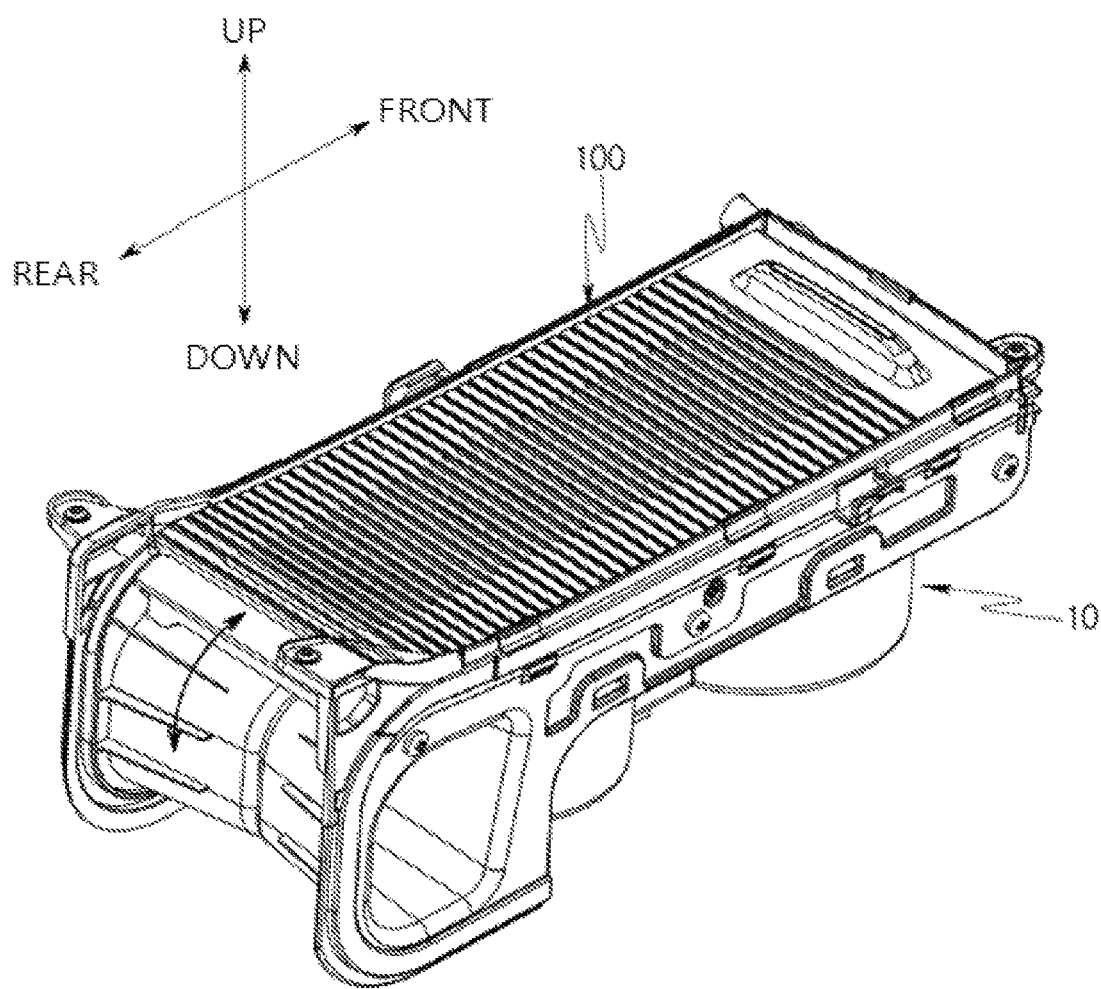
FIG. 1 is a perspective diagram illustrating an example applying a cover for a cup holder device for a vehicle in accordance with an embodiment of the present disclosure.
Figure 2:
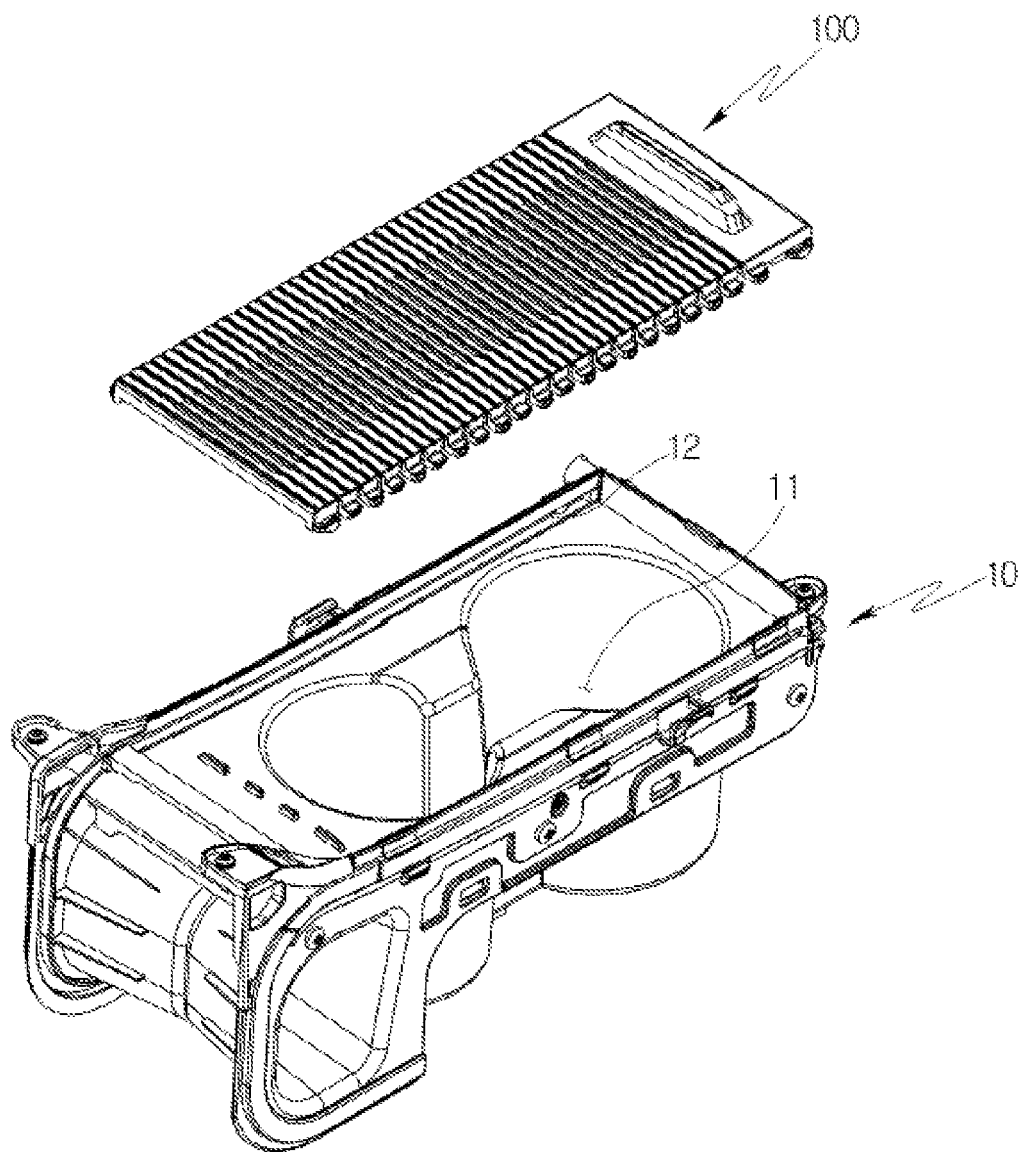
FIG. 2 is an exploded perspective diagram illustrating the cover for the cup holder device for the vehicle illustrated in FIG. 1.
Figure 3:
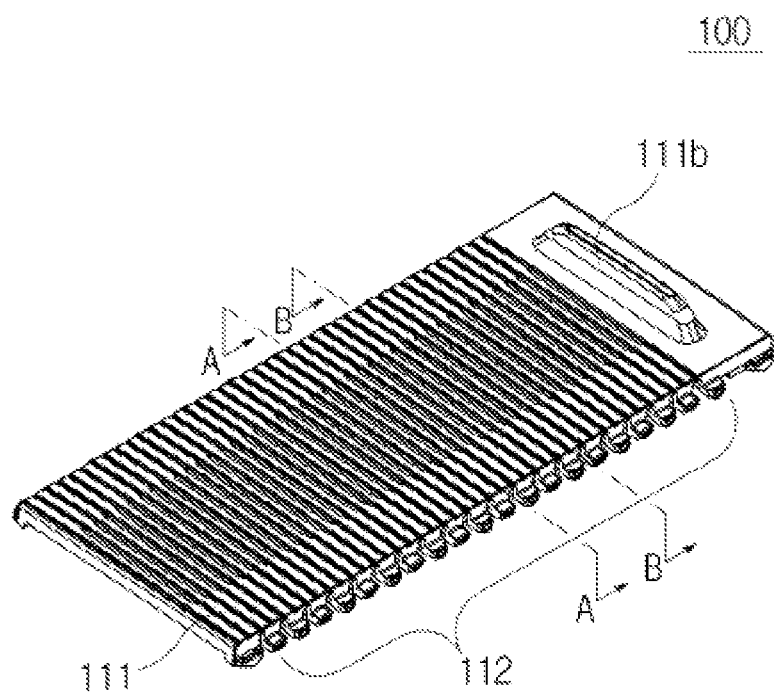
FIG. 3 is a perspective diagram illustrating the cover for the cup holder device for the vehicle illustrated in FIG. 2.
Figure 4:
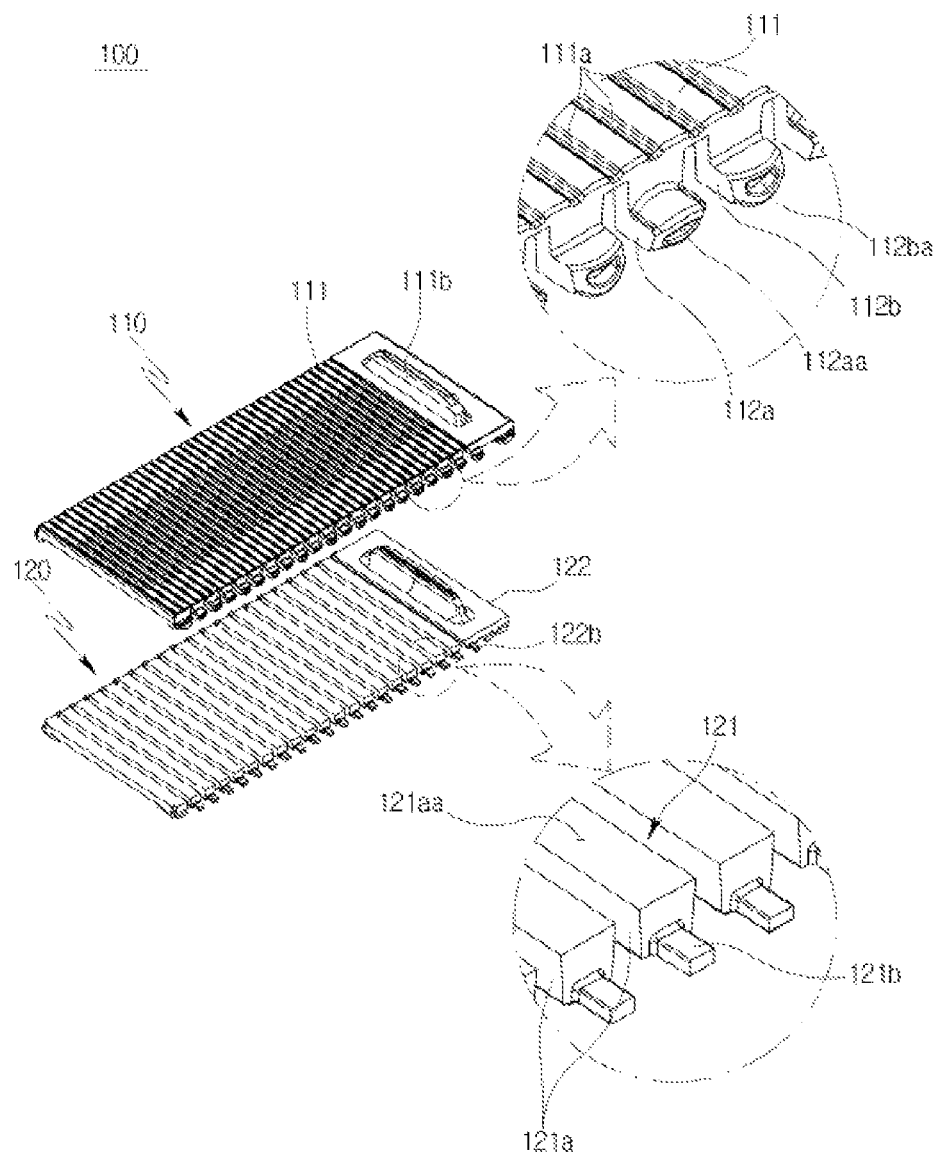
FIG. 4 is an exploded perspective diagram illustrating the cover for the cup holder device for the vehicle illustrated in FIG. 3.
Figure 5:
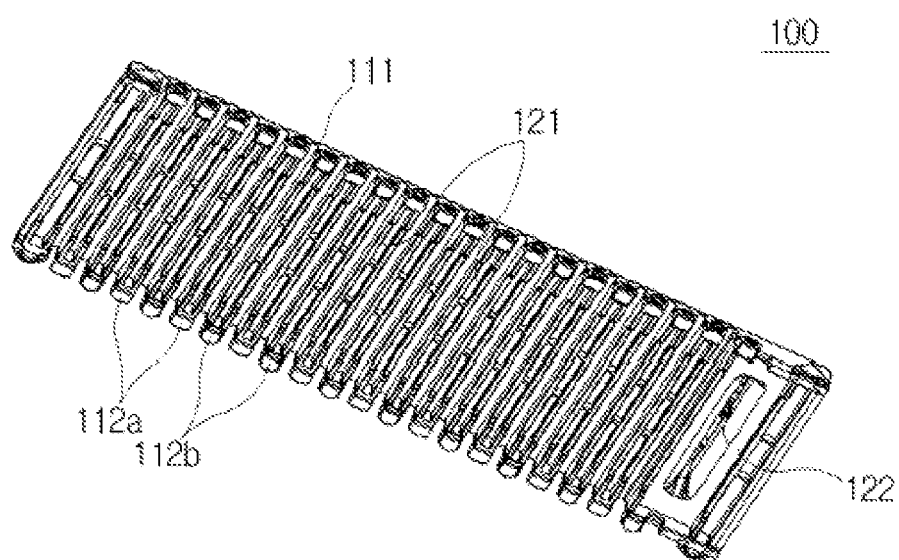
FIG. 5 is a perspective diagram illustrating the state viewing the cover for the cup holder device for the vehicle illustrated in FIG. 3 at another angle for helping understanding of FIG. 3.
Figure 6:
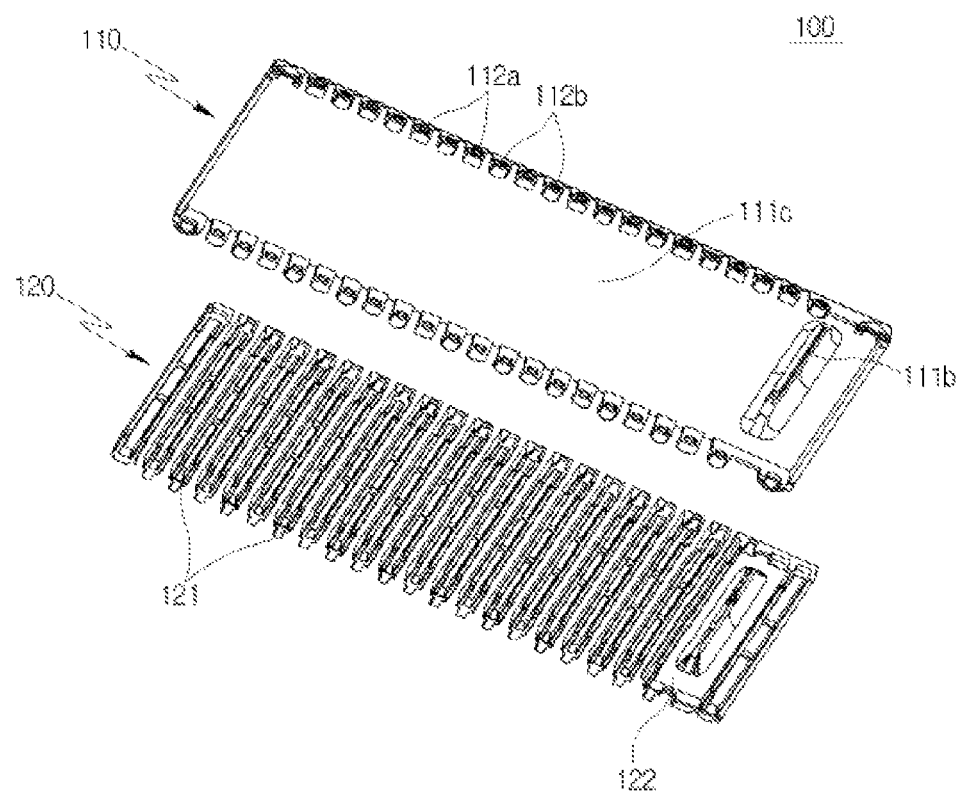
FIG. 6 is an exploded perspective diagram illustrating the cover for the cup holder device for the vehicle illustrated in FIG. 5 for helping understanding of FIG. 4.
Figure 7:
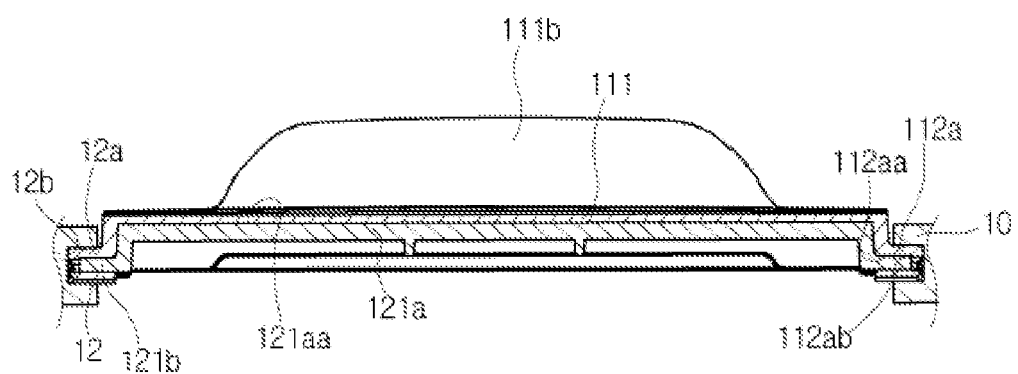
FIG. 7 is a diagram for explaining a guide structure by illustrating a guide groove additionally and simply on a cross-sectional diagram taken along line A-A in FIG. 3.
Figure 8:
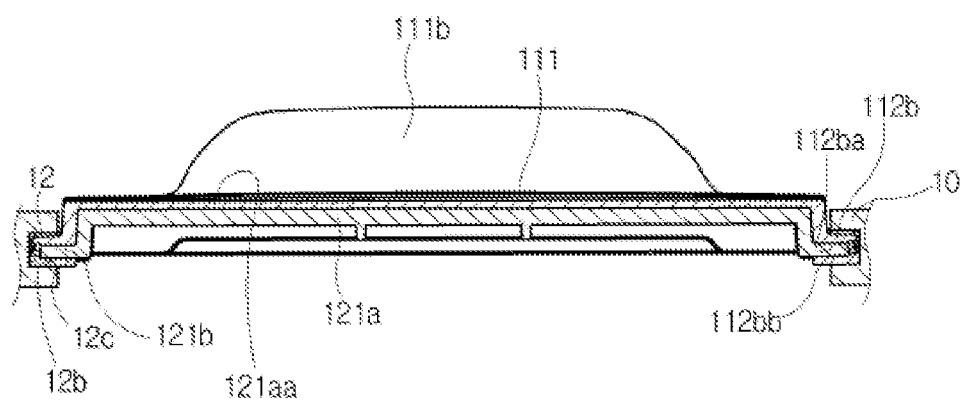
FIG. 8 is a diagram for explaining a guide structure by illustrating the guide groove additionally and simply on a cross-sectional diagram taken along line B-B in FIG. 3.

FIG. 1 is a perspective diagram illustrating an example applying a cover for a cup holder device for a vehicle in accordance with an embodiment of the present disclosure, FIG. 2 is an exploded perspective diagram illustrating the cover for the cup holder device for the vehicle illustrated in FIG. 1, FIG. 3 is a perspective diagram illustrating the cover for the cup holder device for the vehicle illustrated in FIG. 2, FIG. 4 is an exploded perspective diagram illustrating the cover for the cup holder device for the vehicle illustrated in FIG. 3, FIG. 5 is a perspective diagram illustrating the state viewing the cover for the cup holder device for the vehicle illustrated in FIG. 3 at another angle for helping understanding of FIG. 3, FIG. 6 is an exploded perspective diagram illustrating the cover for the cup holder device for the vehicle illustrated in FIG. 5 for helping understanding of FIG. 4, FIG. 7 is a diagram for explaining a guide structure by illustrating a guide groove additionally and simply on a cross-sectional diagram taken along line A-A in FIG. 3, and FIG. 8 is a diagram for explaining a guide structure by illustrating the guide groove additionally and simply on a cross-sectional diagram taken along line B-B in FIG. 3.

Referring to FIGS. 1 and 2, a cover 100 for a cup holder device 10 for a vehicle in accordance with an embodiment of the present disclosure opens and closes a receiving space 11 of the cup holder device 10 provided inside a vehicle, and has both side portions fitted into a pair of guide grooves 12, which are provided at both sides of the upper portion of the receiving space 11, have the portions bent to the outside of the rear of the receiving space 11, and are provided to face each other, to be slidably moved.

Accordingly, when being moved to the opened location or the closed location, the cover 100 should be able to be flexibly bent on the bent portion of the guide groove 12, and on the closed location, should also have rigidity that can withstand a driver's pressure or the load of the article that can be loaded thereon.

Further referring to FIGS. 3 to 8, the cover 100 is configured to include a cover unit 110 and a support unit 120.

The cover unit 110 is configured to include a body 111, and a side surface protrusion group 112 formed to be protruded on both side surfaces of the body 111 and provided in plural along the longitudinal direction of the body 111.

The body 111 has the shape of a roughly rectangular plate having a thin thickness, and is formed with a plurality of grooves 111a along the longitudinal direction thereof. The plurality of grooves 111a are formed in the width direction of the body 111, respectively, to be individually located in parallel to each other. The plurality of grooves 111a can be formed to have a partially small thickness in the body 111 so that the bent portion of the guide groove 12 can be flexibly bent when the cover 100 is moved to the opened location or the closed location.

In addition, a lever 111b is further formed on the body 111 as an operating means for opening and closing the cover 100 for a driver, etc.

Meanwhile, the side surface protrusion group 112 can be configured to include a plurality of first side surface protrusions 112a contacting a ceiling surface 12a and a side surface 12b of the guide groove 12, and a plurality of second side surface protrusions 112b contacting a bottom surface 12c and the side surface 12b of the guide groove 12.

In this case, the first side surface protrusion 112a has the upper portion further protruded in the width direction of the body 111, and has the upper surface convexly formed when viewed in the width direction of the body 111. In addition, the first side surface protrusion 112a has the lower portion further recessed in the width direction of the body 111 than the upper portion thereof and has the lower surface flatly formed not to reach the bottom surface 12c of the guide groove 12. Accordingly, the first side surface protrusion 112a contacts the ceiling surface 12a and the side surface 12b of the guide groove 12 to guide the slide movement of the cover 100 when the cover 100 is opened and closed.

Meanwhile, the second side surface protrusion 112b has the symmetrical shape in which the first side surface protrusion 112a is vertically reversed. That is, the second side surface protrusion 112b has the lower portion further protruded in the width direction of the body 111, and has the lower surface convexly formed when viewed in the width direction of the body 111. In addition, the second side surface protrusion 112b has the upper portion further recessed in the width direction of the body 111 than the lower portion thereof and has the upper surface flatly formed not to reach the ceiling surface 12a of the guide groove 12. Accordingly, the second side surface protrusion 112b contacts the bottom surface 12c and the side surface 12b of the guide groove 12 to guide the slide movement of the cover 100 when the cover 100 is opened and closed.

Meanwhile, it is preferable that the first side surface protrusion 112a and the second side surface protrusion 112b are alternately located in the longitudinal direction of the body 111. The side surface protrusion group 112 supports the side surface 12b of the guide groove 12 along the longitudinal direction of the body 111 by such a location, and has a guide structure for alternately supporting the ceiling surface 12a and the bottom surface 12c thereof.

In addition, the side surface protrusion group 112, particularly, as can be confirmed through FIGS. 7 and 8, the same kind of the first side surface protrusion 112a or the second side surface protrusion 112b can be located to be symmetrical to each other in the width direction of the body 111. However, such a structure can be changed to a structure in which the first side surface protrusion 112a and the second side surface protrusion 112b are located in the width direction of the body 111, respectively.

Meanwhile, the first side surface protrusion 112a and the second side surface protrusion 112b are formed with installation holes 112aa, 112ba into which a coupling protrusion 121b of a support member 121, which will be described later, is fitted in the width direction of the body 111, respectively. A detailed description thereof will be described later.

In addition, it is preferable that the first side surface protrusion 112a and the second side surface protrusion 112b have stepped portions 112ab, 112bb on which an end portion of the coupling protrusion 121b hits the inside surface of the installation holes 112aa, 112ba. A detailed description thereof will be described later.

The cover unit 110 can be formed by integrally molding the body 111 and the side surface protrusion group 112, and can be made of a resin material. Particularly, it is preferable that the cover unit 110 is configured so that the support unit 120, which will be described later, has a small rigidity to be flexibly bent. For example, it is preferable that the cover unit 110 is configured to contain a TPE resin having good softness.

As described above, the cover unit 110 is made of a flexible material, and includes the first side surface protrusion 112a and the second side surface protrusion 112b that contact the inside surface of the guide groove 12, thus reducing frictional noise when the cover 100 is opened and closed, and enhancing the feeling of operation.

The support unit 120 is installed on the bottom surface side of the cover unit 110 to support the load of the cover unit 110.

The support unit 120 serves as a reinforcing structure that provides rigidity to withstand a driver's pressure or the load of the article that can be loaded when the cover 100 is in the closed location. In addition, the support unit 120 provides a supporting force that the shape of the cover 100 can be kept even when a driver, etc. applies an excessive opening and closing force in order to open and close the cover 100.

The support unit 120 has a structure in which a plurality of support members 121 having the shape of a slice, respectively, are installed to be spaced apart from each other in the longitudinal direction of the cover unit 110. It is natural that the support unit 120 can further include a separate support part 122 for supporting the portion on which the lever 111b of the cover unit 110 is formed in addition to the support member 121.

In this time, it is preferable that the support member 121 is configured to include a central portion 121a having an attachment surface 121aa attached to the bottom surface 111c of the body 111 of the cover unit 110, and a pair of the coupling protrusions 121b formed to be protruded on both side surfaces of the central portion 121a and coupled to the side surface protrusion group 112 of the cover unit 110, respectively.

The coupling protrusion 121b is formed to have the bottom surface that is the same height as the bottom surface of the central portion.

More specifically, the support member 121 is installed in the width direction of the cover unit 110, and the coupling protrusion 121b of the corresponding support member 121 is fitted and coupled to the installation hole 112aa or the installation hole 112ba, which is formed on the first side surface protrusion 112a or the second side surface protrusion 112b located on the end portion thereof. In this time, the end portion of the coupling protrusion 121b is assembled further firmly not to be separated in the width direction of the cover unit 110 by hitting the stepped portions 112ab, 112bb provided on the inside surfaces of the installation holes 112aa, 112ba. Particularly, the coupling structure prevents excessive deformation of the side surface protrusion group 112 inside the guide groove 12 even when an excessive force is applied to the cover 100.

The support unit 120 can be formed to integrally mold the central portion 121a and the coupling protrusion 121b included in the support member 121, and can be made of a resin material. Particularly, it is preferable that the support unit 120 serves as a reinforcing structure of the cover unit 110, such that the rigidity of the support unit 120 is greater than that of the cover unit. For example, when the cover unit 110 is configured to contain a TPE resin, the support unit 120 can be configured to contain an ABS resin, thus providing a reinforcing force.

As described above, the support unit 120 can simultaneously adopt a method for attaching and coupling to the cover unit 110, thus enhancing structural safety and durability as compared with the case where only the method for attaching is adopted.

Meanwhile, the support part 122 can be also formed with a coupling protrusion 122b having the same shape as the coupling protrusion 121b. The coupling protrusion 122b can be also removed when the side surface protrusion group 112 is not formed on the corresponding location.

As described above, the present disclosure has been described with reference to the embodiments illustrated in the drawings but it is only exemplary, and it should be understood that various changes and other embodiments equivalent thereto can be made based on the general knowledge in the art to which the present disclosure pertains.

Accordingly, the pure technical scope of the present disclosure is made by the claims that will be described below, and should be defined based on the specifics of the disclosure as described above.

The present disclosure relates to the cover for the cup holder device for the vehicle, and can be available in the industrial field related to the internal articles of the vehicle.

What is claimed is:

1. A cover for a cup holder device for a vehicle, the cover being configured to be slidably moved to open or close a receiving space of the cup holder device disposed inside a vehicle, and having both side portions fitted into a pair of guide grooves, which are positioned at both sides of an upper portion of the receiving space, have portions bent to an outside of a rear portion of the receiving space, and are positioned to face each other, the cover comprising:
   a cover unit including a body, and a side surface protrusion group protruded from both side surfaces of the body and having a plurality of side surface protrusions along a longitudinal direction of the body; and
   a support unit disposed on a bottom surface side of the cover unit to support a load of the cover unit, and including a plurality of support members respectively having a shape of a slice, the plurality of support members being spaced apart from each other in a longitudinal direction of the cover unit,
   wherein each of the plurality of support members includes a central portion having an attachment surface adjacent to a bottom surface of the body of the cover unit, and a pair of coupling protrusions protruded from both side surfaces of the central portion and coupled to the side surface protrusion group of the cover unit.

2. The cover for the cup holder device for the vehicle of claim 1,
   wherein both the cover unit and the support unit are made of a resin material, and a rigidity of the support unit is greater than that of the cover unit.

3. The cover for the cup holder device for the vehicle of claim 2,
   wherein the cover unit contains a TPE resin, and the support unit contains an ABS resin.

4. The cover for the cup holder device for the vehicle of claim 1,
   wherein the plurality of side surface protrusions of the side surface protrusion group comprises:
   a plurality of first side surface protrusions contacting a ceiling surface and a side surface of each of the guide grooves; and
   a plurality of second side surface protrusions contacting a bottom surface and the side surface of each of the guide grooves.

5. The cover for the cup holder device for the vehicle of claim 4,
   wherein each of the first side surface protrusions and each of the second side surface protrusions are alternately located in the longitudinal direction of the body.

6. The cover for the cup holder device for the vehicle of claim 4,
   wherein at least two of the first side surface protrusions or at least two of the second side surface protrusions are symmetrical to each other.

7. The cover for the cup holder device for the vehicle of claim 4,
   wherein each of the first side surface protrusions or each of the second side surface protrusions has an installation hole into which a coupling protrusion of the respective support member is fitted in a width direction of the body.

8. The cover for the cup holder device for the vehicle of claim 7,
   wherein each of the first side surface protrusions or each of the second side surface protrusions has a stepped portion on which an end portion of the coupling protrusion hits an inside surface of the installation hole.

* * * * *